R. HUFF.
FUEL TANK PRESSURE SYSTEM.
APPLICATION FILED SEPT. 2, 1909.
1,126,012.
Patented Jan. 26, 1915.
3 SHEETS—SHEET 1.
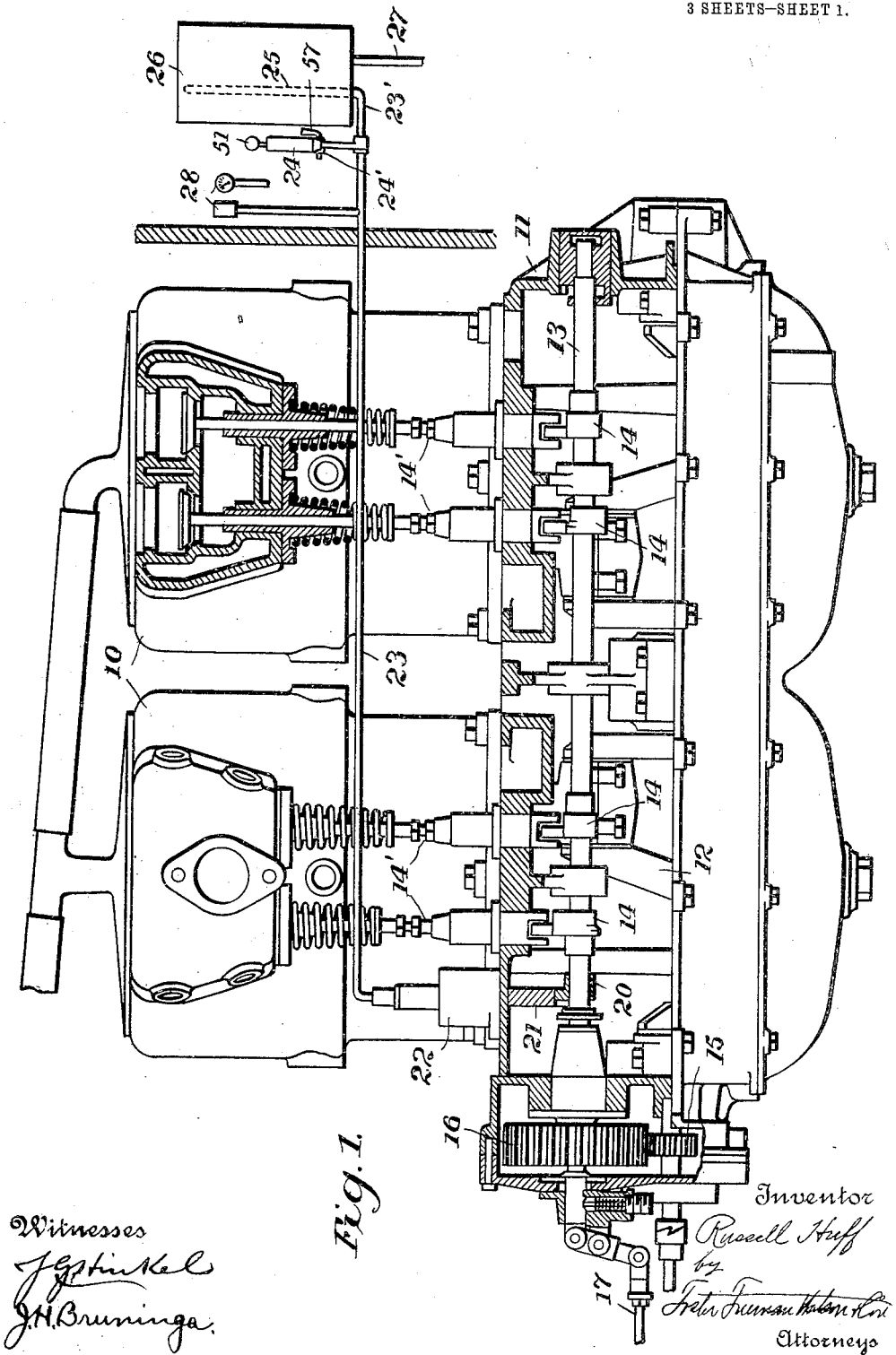

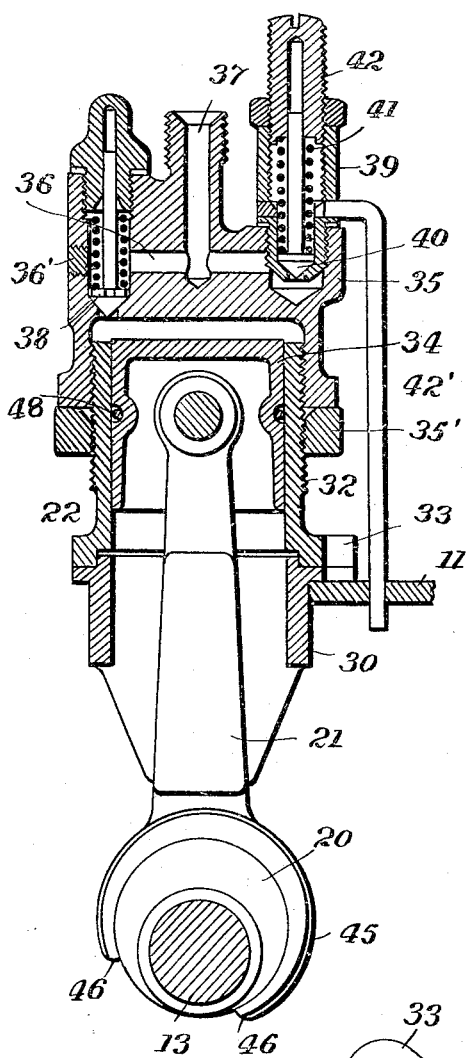
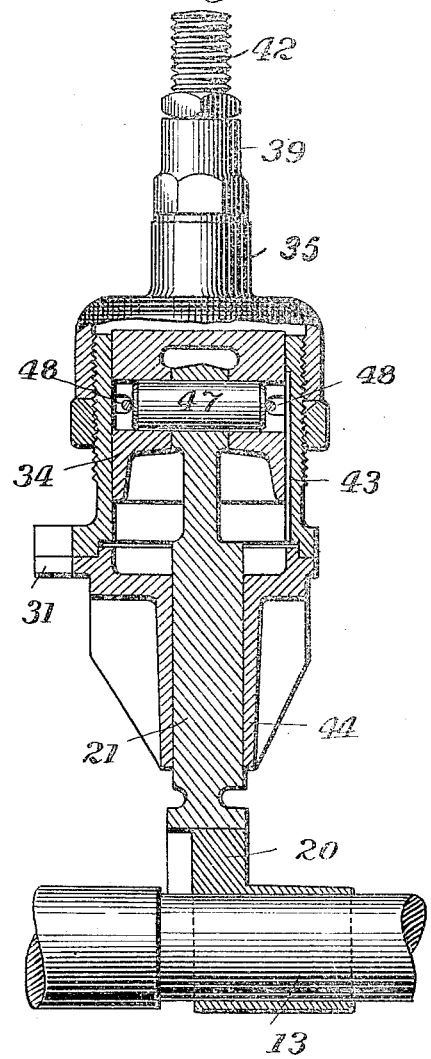
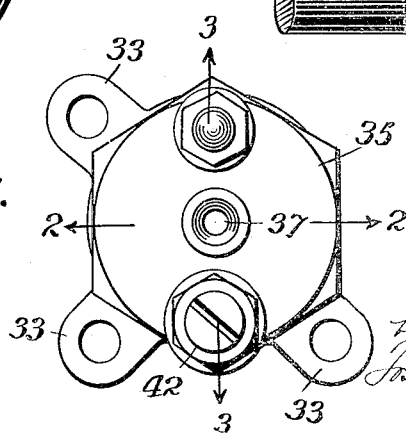

R. HUFF.
FUEL TANK PRESSURE SYSTEM.
APPLICATION FILED SEPT. 2, 1909.
1,126,012.
Patented Jan. 26, 1915.
3 SHEETS—SHEET 3.
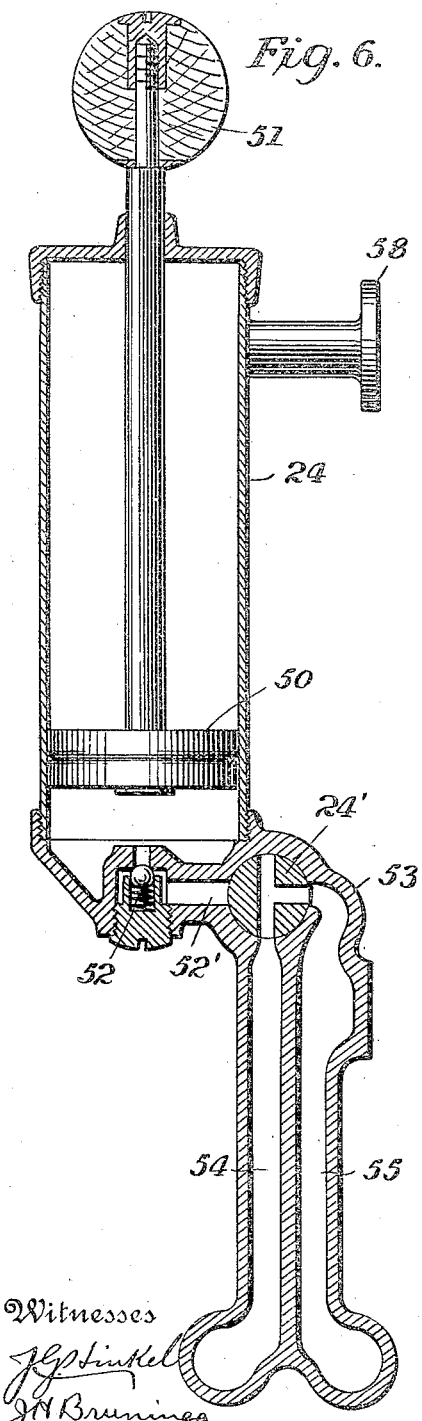
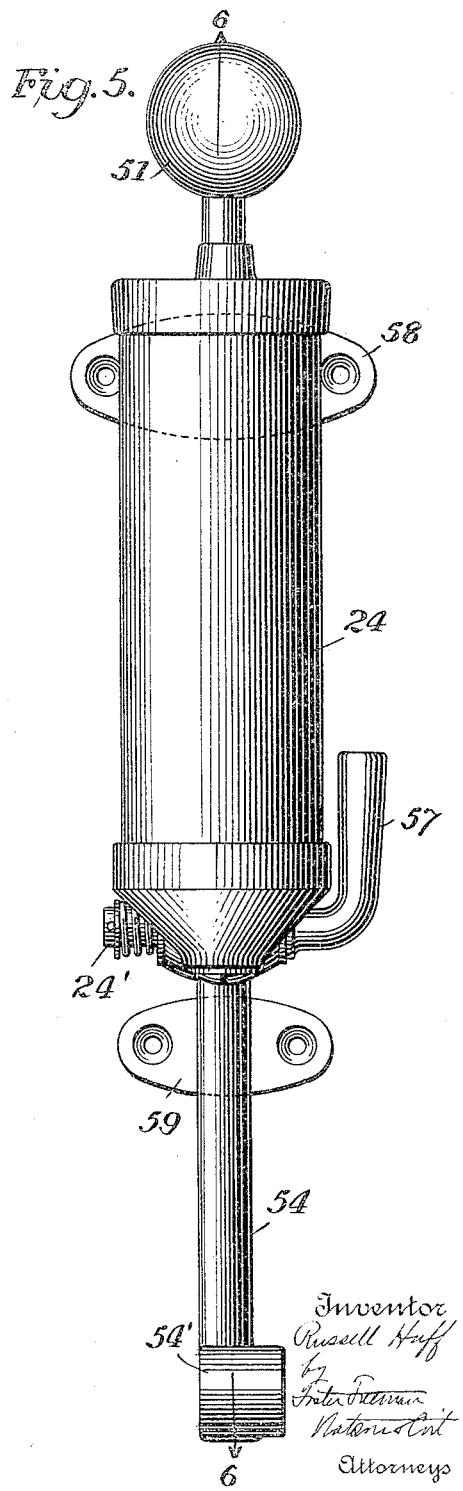

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

FUEL-TANK PRESSURE SYSTEM.

1,126,012. Specification of Letters Patent. Patented Jan. 26, 1915.

Application filed September 2, 1909. Serial No. 515,885.

*To all whom it may concern:*

Be it known that I, RUSSELL HUFF, a citizen of the United States, and resident of Detroit, in the county of Wayne and State of Michigan, have invented certain new and useful Improvements in Fuel-Tank Pressure Systems, of which the following is a specification.

This invention relates to fuel tank pressure systems for hydrocarbon motors.

The objects of this invention are to provide a system in which the tank is supplied with internal pressure both by a manually operated pump and an automatic pump driven by the engine, and to supply valve mechanism and connections whereby either of the pumps may be thrown into communication with the tank; to provide mechanism whereby the relief valve for regulating the pressure in the tank, and the pumps are rendered accessible; to arrange the pressure gage in a novel manner; and to simplify the construction of the pumps whereby they may be easily assembled in correct position.

The invention generally stated consists in an automatic pump which is driven by the engine, in this case by an eccentric mounted upon the cam shaft, a pipe connecting the pump with a fuel supply tank, a hand-operated pump, and a three-way valve which is adapted to connect either of the pumps with the tank, or cut out both. A pressure gage is connected to the pipe at a point located between the cut-off valve and the engine-driven pump. The relief valve is mounted upon the engine-driven pump which is mounted upon the crank case whereby the pump and relief valves are rendered accessible. The construction of the automatically driven pump is such that it may be easily assembled and the individual parts are so constructed that it is insured that the parts will be located in proper position.

In the drawings: Figure 1 is an elevation partly in section of a four-cylinder hydrocarbon engine showing this invention applied thereto; Fig. 2 is a section on the line 3—3 Fig. 4, showing the engine-driven pump; Fig. 3 is a section on the line 2—2 Fig. 4; Fig. 4 is a plan view of the engine-driven pump; Fig. 5 is an elevation of the manually operated pump; and Fig. 6 is a section on the line 6—6 Fig. 5.

Referring to the drawings, 10, 10 designate the cylinders of a four-cylinder hydrocarbon engine, which cylinders are bolted in pairs to the crank case 11. A crank-shaft 12 and a valve-shaft 13 are mounted in the crank case. The valve-shaft is provided with cams 14 adapted to engage cam rolls mounted upon the exhaust valve stems 14'. The valve-shaft 13 and its cams are of the construction shown in my copending application Serial No. 327,049.

As described in the above application the valve-shaft 13 is movable endwise to throw the relief cams in operative engagement with the rolls upon the stems 14', an operating handle 17 being provided for this purpose. The valve-shaft 13 is driven by a two-to-one gear 15, 16, from the crank shaft.

An eccentric 20 is rigidly connected with the shaft 13 and is adapted to operate a connecting rod 21 connected to the piston of the pump 22 which is bolted to the crank-case. A pipe line composed of sections 23, 23' extends from the outlet of the pump 22 to the fuel supply tank 26, the section 23' terminating in a riser 25 extending to the top of the tank. A hand-pump 24 connects the sections 23, 23', and a three-way valve 24' is interposed in this connection and is adapted to connect either of the pumps with the pipe 23'. A pipe 27 extends from the tank 26 to the carbureter. A pressure gage 28 is connected to the pipe 23 at a point located between the valve 24' and the pump 22.

The pump 22 comprises a base 30 provided with ears 31 and extends through a hole formed in the crank case. The cylinder 32 is provided with ears 33. The sections 30 and 32 are bolted to the crank case by bolts extending through the ears 31 and 33. A piston 34 operates in the cylinder and is connected to the connecting rod 21 by means of a wrist pin. The cylinder 32 is externally threaded and is closed by a cylinder head 35 which is provided with an internal thread engaging the thread on the cylinder. A lock-nut 35' is provided for locking the head in place. The cylinder head is provided with a transverse passage 36 which may be formed therein in any suitable manner, preferably by boring the same, the hole being closed by a plug 36'. An outlet passage 37 intersects the passage 36 and connects with the pipe line 23 in any suitable manner, preferably by the ordinary union joint. A spring-controlled check valve 38 controls the connection between the passage 36 and the cylinder. A relief valve casing 39 is screwed into the cylinder head and is provided with a relief valve 40 controlled by a spring 41, the tension of the spring being controlled by an adjusting screw 42. A pipe 42' connects the cavity above the relief valve with the crank case 11. The cylinder is provided on its interior surface with a groove 43 which throws the crank-case into communication with the upper part of the cylinder when the piston is in its lowest position, the communication however being cut off when the piston passes the end of the groove, as shown in Fig. 3. The base 30 is provided with downwardly extending portions forming guides 44 for the connecting rod 21. The connecting rod is provided with an eccentric strap 45 cut away as shown at 46, 46. This cut away portion is of sufficient size so that the eccentric strap 45 can be removed from the shaft by moving the same endwise until it clears the eccentric 20, and then moving the same vertically. The wrist pin 47 connecting the piston and the connecting rod is removable and retained in place by the usual spring band 48, It will be seen that the pump is of such a construction that the parts may be easily assembled. The guides 44 guide the connecting rod 21 and restrain it against endwise movement while the valve shaft 13 is moved endwise to throw the relief cams into and out of position. The connecting rod 21 and the eccentric strap 45 are unsymmetrical in form, whereby it is insured that the connecting rod and the eccentric will be placed in proper position on the valve shaft and in addition the off-set arrangement of the eccentric strap 45 will prevent interference between the strap and the connecting rod and the crank-shaft. The entire pump may be disassembled and disconnected from the valve-shaft in the following manner: The bolts extending through the ears 33 are removed and the cylinder 32 is removed from the piston by an endwise and upward movement. The piston is now removed from the connecting rod 21 by removing the band 48 and the wrist pin 47. The base 30 is now removed from the connecting rod, and the connecting rod is moved to the left until the strap 45 clears the eccentric 20, and then moved upwardly, the opening formed in the strap 45 clearing the shaft 13. The valve-shaft 13 must be moved to the position shown in Figs. 1 and 3 in order that the strap 45 may clear the eccentric 20. In order to insure that the parts 30 and 32 may be correctly positioned each of said parts is provided with three ears 31 and 33, respectively, and the crank case is provided with three tapped holes for receiving the bolts extending through the ears.

The pump 24 is provided with a piston 50 of the usual construction and with an operating handle 51. A check-valve 52 of the usual construction is located in the discharge passage 52'. The body of the pump is provided with an extension 53 which has formed therein a channel 54, connected with the pipe 23, which is screwed into the boss 54', and a channel 55 similarly connected with the pipe 23'. A three-way valve 24' provided with a handle 57 is located at the junction of the channels 54 and 55 and the discharge passage 52'. The three-way valve is adapted to connect either the passage 52', or the channel 54 leading to the pump 22, with the channel 55 and the pipe 23'. Suitable stops are provided for arresting the valve in two extreme positions. An intermediate position of the valve will cut off both the passage 52' and the channel 54 from the channel 55 and the pipe 23'. The pump 24 is provided with attaching lugs 58, 59, whereby it may be attached to the vehicle or a support.

The operation of this system is as follows: With the valve 24' in the position shown in Fig. 6, in which it connects the channels 54 and 55, the pump 22 is connected to the pipe 23' and the riser 25. While the engine is running the tank 26 will be continually supplied with internal pressure by means of the air drawn from the crank case. The relief valve 40, located on the pump 22, will govern the pressure within the tank 26, and since it is located on the pump it is rendered more accessible than if it were located on the supply tank. Furthermore, since in motor vehicles the supply tank is generally located beneath the seat, it is objectionable to locate the relief valve on the tank, as the escaping air may be laden with a combustible gas. In this construction however the air which escapes past the relief valve is discharged back into the crank case or may, if so desired, escape into the atmosphere in the neighborhood of the engine, which is not objectionable. The engine-driven pump is of small capacity and it is therefore desirable to provide an auxiliary pump whereby the pressure within the supply tank may be quickly raised to the desired value. For this reason the hand-pump 24 is provided. When the engine is started the valve 24' is thrown to the left from the position shown in Fig. 6 until the passage 52' is connected with the channel 55, and the hand-pump is operated until the desired pressure is obtained. This pressure may at any time be determined by throwing the valve back to the position shown in Fig. 6 and noting the reading of the pressure gage 28. The pressure gage 28 is located between the valve 24' and the pump 22. Therefore it will at all times note the pressure of the tank 26 if the pipes 23, 23' are thrown into communication by the valve 24'. By closing the valve 24' and running the engine the condition of the pump 22 may be determined. If this pressure gage were located on the tank 26' it would be impossible to determine the condition and the proper working of the pump 22 until the tank 26, which is of large capacity relatively to the pump 22, would be filled, but by locating the gage between the valve 24' and the pump 22 the condition of the pump may be determined at all times by simply closing the valve 24'.

It is obvious that various changes may be made in the details of construction without departing from this invention and it is therefore to be understood that this invention is not to be limited to the specific construction shown and described.

What I claim is:

1. In a hydrocarbon motor, the combination with an endwise movable cam shaft, of an eccentric thereon, a pump, a piston in the pump, a connecting rod connecting the piston and eccentric, and guides on both sides of the piston rod to prevent lateral displacement thereof when the cam shaft is shifted.

2. In a hydrocarban motor, the combination with a crank case and a shaft in the crank case, of an eccentric on the shaft, a pump on the crank case, a piston for the pump, and a connecting rod connecting the piston and eccentric, said connecting rod adapted to be disconnected from the eccentric by a movement endwise of the shaft.

3. In a hydrocarbon motor, the combination with the crank case, a cam shaft mounted therein, and an eccentric mounted on the cam shaft, of a pump mounted on the crank case and having a connecting rod formed with a bearing to fit said eccentric, said bearing being cut away a distance more than the diameter of the cam shaft but less than the diameter of the eccentric, whereby said rod may be fitted to and removed from said eccentric by a movement endwise of the cam shaft.

4. In a hydrocarbon motor, the combination with a crank case and a shaft in the crank case, of an eccentric on the shaft, a pump on the crank case, a piston for the pump, a connecting rod connecting the piston and eccentric, said connecting rod adapted to be disconnected from the eccentric by a movement endwise of the shaft, and a removable guide for the connecting rod to prevent lateral displacement thereof.

5. In a hydrocarbon motor, the combination with a crank case and a shaft in the crank case, of an eccentric on the shaft, a pump on the crank case, a piston for the pump, a connecting rod connecting the piston and eccentric, said connecting rod adapted to be disconnected from the eccentric by a movement endwise of the shaft, a removable guide for the connecting rod to prevent lateral displacement thereof, and a detachable connection between the piston and the connecting rod to permit removal of the guide.

In testimony whereof I affix my signature in presence of two witnesses.

RUSSELL HUFF.

Witnesses:
 ALFRED H. KNIGHT,
 O. E. HUNT.

Copies of this patent may be obtained for five cents each, by addressing the "Commissioner of Patents, Washington, D. C."